(12) United States Patent
Brumley, II et al.

(10) Patent No.: US 9,494,677 B2
(45) Date of Patent: Nov. 15, 2016

(54) SYSTEM AND METHOD FOR SUPPRESSING RADIO FREQUENCY TRANSMISSIONS

(71) Applicant: Pegasus Global Strategic Solutions LLC, Reston, VA (US)

(72) Inventors: Robert Haywood Brumley, II, Weems, VA (US); Michael J. Reedy, South Riding, VA (US); Robert Haywood Brumley, III, Richmond, VA (US)

(73) Assignee: Pegasus Global Strategic Solutions LLC, Reston, VA (US)

( * ) Notice: Subject to any disclaimer, the term of this patent is extended or adjusted under 35 U.S.C. 154(b) by 563 days.

(21) Appl. No.: 13/959,670

(22) Filed: Aug. 5, 2013

(65) Prior Publication Data

US 2016/0216365 A1    Jul. 28, 2016

Related U.S. Application Data

(63) Continuation of application No. 13/487,603, filed on Jun. 4, 2012, now Pat. No. 8,502,726, which is a
(Continued)

(51) Int. Cl.
*G01S 13/38* (2006.01)
*G01S 7/38* (2006.01)

(52) U.S. Cl.
CPC ....................................... *G01S 7/38* (2013.01)

(58) Field of Classification Search
CPC .... G01S 7/021; G01S 2013/029; G01S 7/38; G01S 7/495; H04K 2203/10; H04K 3/22; H04K 3/45; H04K 3/68; H04K 3/65; H04K 3/80; H04K 3/825; H04K 2203/00; H04K 3/00; F41H 13/0043; F41H 13/0068; F41H 13/0075; F41H 13/0093

USPC ........................ 342/13–19, 73, 82–88; 455/1
See application file for complete search history.

(56) References Cited

U.S. PATENT DOCUMENTS 7,391,356 B2    6/2008    Brumley, II et al. ........... 342/13
7,746,265 B2    6/2010    Brumley, II et al. ........... 342/13
(Continued)

OTHER PUBLICATIONS

"Security Intelligence Technologies Announce Its New Product the Stadium Frequency Spectrum Jamming Ssytem", *Business Wire*, , Apr. 21, 2004, <retrieved Apr. 14, 2008 from Business Dateline database>, Document No. 621748111; 3 pages.

*Primary Examiner* — John B Sotomayor
(74) *Attorney, Agent, or Firm* — Pillsbury Winthrop Shaw Pittman LLP

(57) ABSTRACT

A system and method for suppressing radio frequency ("RF") transmissions includes a transmitter for transmitting electronic signals that suppresses (e.g., prevents, disrupts, jams, interferes with or otherwise disables) RF transmissions. Some embodiments of the invention include a transmitter that suppresses one or more signals transmitted from a target transmitter in an RF transmission system to a target receiver in a wireless device operating in the RF transmission system to prevent, disrupt, jam, interfere with or otherwise disable an RF transmission between the target transmitter and the target receiver in the wireless device (i.e., target wireless device). These systems and methods may be used to interrupt communication, command and control of non-friendly combatant. These systems and methods may also be used to suppress RF transmissions to prevent the detonation of improvised explosive devices, or IEDs.

20 Claims, 14 Drawing Sheets

Related U.S. Application Data continuation of application No. 12/823,784, filed on Jun. 25, 2010, now Pat. No. 8,193,964, which is a continuation of application No. 12/144,400, filed on Jun. 23, 2008, now Pat. No. 7,746,265, which is a continuation of application No. 11/228,247, filed on Sep. 19, 2005, now Pat. No. 7,391,356.

(60) Provisional application No. 60/610,536, filed on Sep. 17, 2004.

(56) References Cited

U.S. PATENT DOCUMENTS

| | | |
|---|---|---|
| 8,193,964 B2 | 6/2012 | Brumley, II et al. ........... 342/13 |
| 8,502,726 B2 | 8/2013 | Brumley, II et al. ........... 342/14 |
| 2006/0164283 A1 | 7/2006 | Karlsson ........................ 342/14 |
| 2007/0063886 A1 | 3/2007 | Brumley, II et al. ........... 342/13 |
| 2008/0254738 A1 | 10/2008 | Brumley et al. ................. 455/1 |
| 2010/0259436 A1 | 10/2010 | Brumley, II et al. ........... 342/14 |
| 2012/0242527 A1 | 9/2012 | Brumley, II et al. ........... 342/14 |

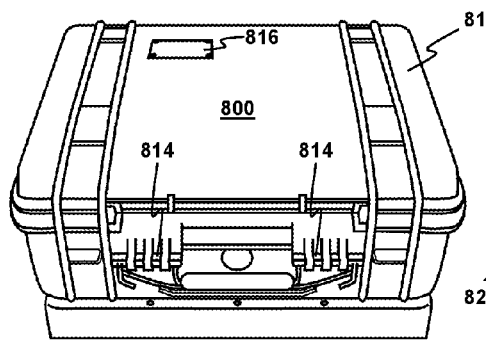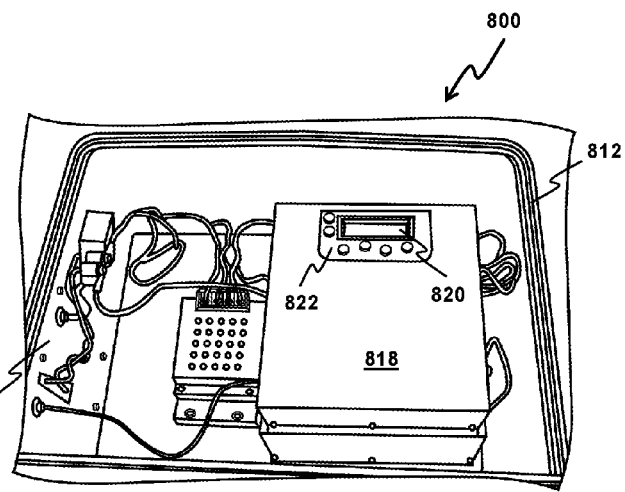
FIG. 8A
FIG. 8B

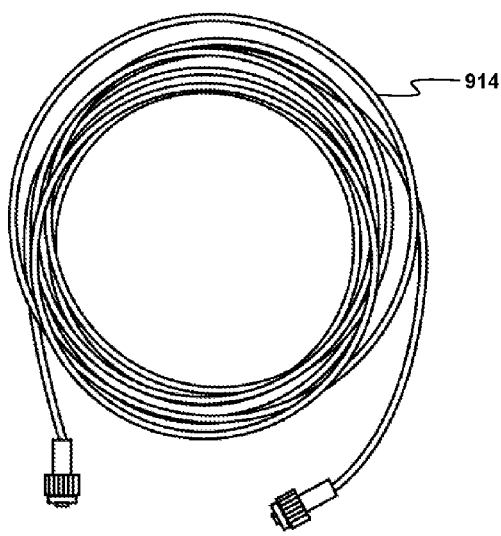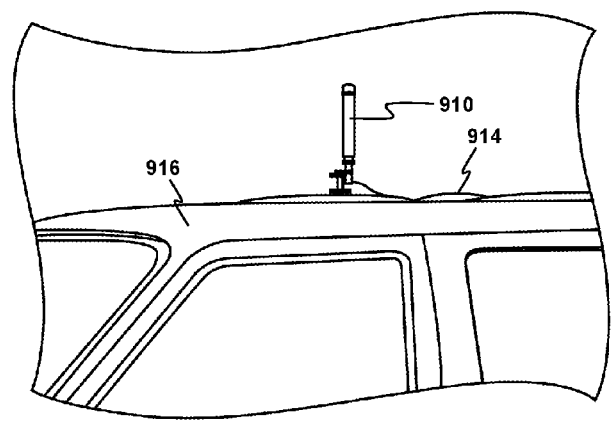
FIG. 9C                                FIG. 9D

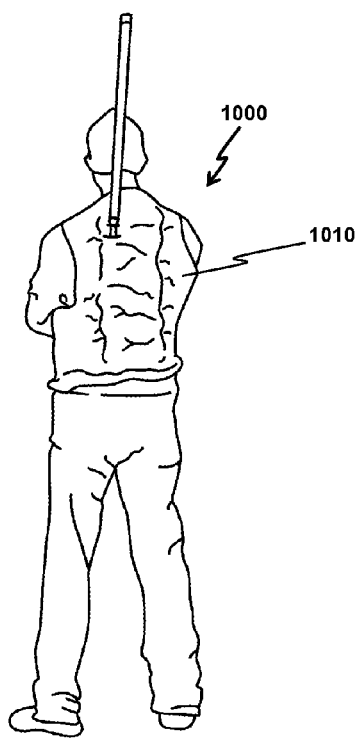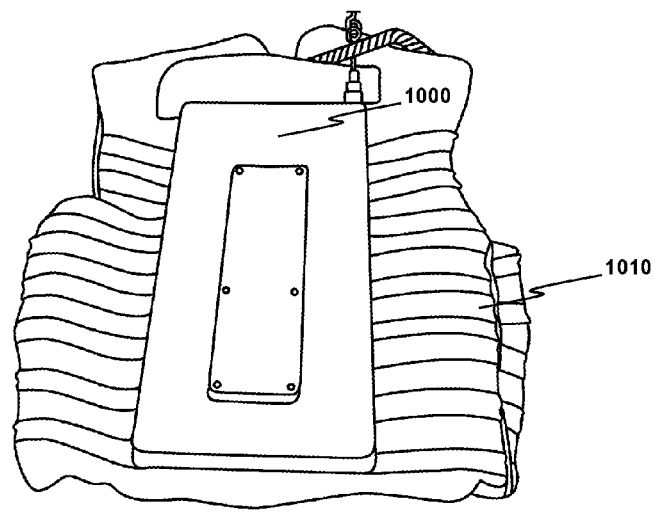
FIG. 10A
FIG. 10B

SYSTEM AND METHOD FOR SUPPRESSING RADIO FREQUENCY TRANSMISSIONS

RELATED APPLICATIONS

This application is a continuation of U.S. patent application Ser. No. 13/487,603, filed Jun. 4, 2012, entitled "System and Method for Suppressing Radio Frequency Transmissions", now U.S. Pat. No. 8,502,726 issued Aug. 6, 2013, which is a continuation of U.S. patent application Ser. No. 12/823,784, filed Jun. 25, 2010, entitled "System and Method for Suppressing Radio Frequency Transmissions," now U.S. Pat. No. 8,193,964 issued Jun. 5, 2012, which is a continuation of U.S. patent application Ser. No. 12/144,400, filed Jun. 23, 2008, entitled "System and Method for Suppressing Radio Frequency Transmissions," now U.S. Pat. No. 7,746,265 issued Jun. 29, 2010, which is a continuation of U.S. patent application Ser. No. 11/228,247, filed Sep. 19, 2005, entitled "System and Method for Suppressing Radio Frequency Transmissions," now U.S. Pat. No. 7,391,356, issued Jun. 24, 2008; which claims priority to U.S. Provisional Patent Application Ser. No. 60/610,536, filed Sep. 17, 2004, entitled "System and Method for Suppressing Radio Frequency Transmissions," each of which are hereby incorporated herein by reference in their entirety.

FIELD OF THE INVENTION

The invention relates generally to radio frequency ("RF") transmissions, and more particularly to transmitting electronic signals intended to suppress (e.g., prevent, disrupt, jam, interfere with or otherwise disable) RF transmissions between transmitters and receivers occurring within particular frequency channels within a particular region.

BACKGROUND OF THE INVENTION

Radio frequency transmission systems and the various wireless devices that operate within them are commercially widely available, and nearly ubiquitous, throughout the world with systems coming on-line daily even in the remotest areas of the world.

While commercial RF transmission systems are generally thought to improve the overall well-being of mankind and to advance our society, they have found an unintended use in supporting military or terrorist activity of non-friendly countries, organizations, factions, combatants or other groups.

One way by which these non-friendly groups use commercial RF transmission systems is for communication, command, and control. While many commercial RF transmission systems are not secure (with, for example, GSM being a notable exception), their cost and widespread availability, make them an attractive alternative.

Another way by which these non-friendly groups use commercial RF transmission systems is as a detonator for improvised explosive devices ("IEDs"). Typically, combatants fashion an IED using an explosive (e.g., C4), a container (e.g., an unexploded shell) and an RF detonator. The detonator may be wired to a short range wireless remote control device such as an electronic car key, garage door opener, remote control, cordless telephone, or other short range RF transmission device; or to a long range wireless remote control device such as a cell phone, PDA, pager, a WiFi receiver (e.g., in a laptop) or other long range RF transmission device to enable remote detonation.

The short range wireless devices, by definition, have a "short" or limited range (e.g., approximately 50 meters, more or less) and typically require line-of-sight operation between the device and the IED. Accordingly, these short range wireless devices pose a significant risk to a combatant (e.g. a terrorist, a foe, a member of a non-friendly group or organization, a neutral party, or other combatant) either in the form of risk of detection or risk of injury from the IED itself. However, exceptions arise more frequently as combatants employ more unique methods of remote detonation via RF transmission, for example, cordless phones.

The long range wireless devices utilize RF signals transmitted between the device and a terrestrial or satellite antenna. Thus, long range wireless devices do not suffer from the risks to combatants identified above for the short range wireless devices. IEDs detonated with long range wireless devices provide both increased range and anonymity and hence, represent a significant security risk.

In light of these and other dangers and risks associated with RF transmission systems, what is needed is a system and method for suppressing (e.g., preventing, disrupting, jamming, interfering with or otherwise disabling) RF transmissions between target transmitters and/or target receivers operating in a particular region, thereby disabling the communication, the remote detonation or otherwise suppressing the RF transmissions.

SUMMARY OF THE INVENTION

The invention solving these and other problems relates to a system and method for suppressing radio frequency ("RF") transmissions. More particularly, the invention includes a transmitter for transmitting electronic signals that suppresses (e.g., prevents, disrupts, jams, interferes with or otherwise disables) RF transmissions. Some embodiments of the invention include a transmitter that suppresses one or more signals transmitted from a target transmitter in an RF transmission system to a target receiver in a wireless device operating in the RF transmission system to prevent, disrupt, jam, interfere with or otherwise disable an RF transmission between the target transmitter and the target receiver in the wireless device (i.e., target wireless device).

In some embodiments of the invention, if the target transmitter is unable to initiate or otherwise establish and/or maintain an RF transmission with the target wireless device, the target wireless device may not be used for communication, command and control. In other embodiments of the invention, if the target transmitter is unable to initiate or otherwise establish and/or maintain an RF transmission with the target wireless device, the target wireless device may not be used as, or as part of, a detonator for an improvised explosive device ("IED").

Various embodiments of the invention may be used in an offensive manner to interrupt communication, command and control. For example, in advance of and during a raid on a particular combatant location, various embodiments of the invention may be used to suppress communications designed to warn combatants/terrorists at that location or warn or otherwise contact combatants/terrorists at other locations. Various other embodiments of the invention may be used in a defensive matter to suppress RF transmissions to prevent the detonation of IEDs.

In some embodiments of the invention, the transmitter emits a "white noise" signal within one or more frequency bands in which the target wireless device operates. This white noise is received by the target wireless device at a sufficient power level to prevent the receiver of the target wireless device from discriminating or otherwise detecting the RF transmission from the target transmitter. In some embodiments of the invention, the transmitter emits a "white noise" signal that is received by a component of a wireless communication system such as, but not limited to the target wireless transmitter, a base station, cell tower, repeater, satellite or other component of a wireless communication system, at a sufficient power level to prevent the component from discriminating or otherwise detecting the RF transmissions from the target transmitter.

According to various embodiments of the invention, the transmitter may transmit in one or more frequency bands to counter a threat from one or more types of target wireless devices. These frequency bands may include a center frequency and a frequency bandwidth as would be apparent. In some embodiments of the invention, the center frequency and frequency bandwidth is selected so as to provide a certain power level over frequencies included in the frequency band as well as frequencies adjacent the frequency band. For example, the transmitter may have a frequency spectrum with a −3 dB (or −10 dB) frequencies outside the nominal frequency band to effectively cover the frequency band as would be apparent.

In some embodiments, the transmitter may transmit in two, three, four, five, or more different frequency bands. For example, in some embodiments of the invention, the transmitter may operate (selectably or preset) in one or more of the same frequency bands as commercially available wireless communication devices, such as, but not limited to, GSM, CDMA, TDMA, SMR, Cellular PCS, AMPS, FSR, DECT, or other wireless frequency band. In some embodiments of the invention, the transmitter may operate (selectably or preset) in frequency bands associated with various cordless telephones, such as, 900 MHz, 2.4 GHz, or other cordless telephone frequency bands. Other cordless telephone frequency bands may include "customized" frequency bands that commercial cordless telephone receivers and transmitters may not be to operate at "out of the box." For example, the "customized" frequency bands may include frequency bands that hostile parties have been able to use in the past (e.g., for remote detonation of IEDs and/or communication) by modifying commercially available cordless telephone components. In some embodiments of the invention, the transmitter may operate (selectably or preset) in frequency bands associated with various short range wireless devices such as an electronic car key, a garage door opener, a remote control, or other short range wireless device. In some embodiments of the invention, the transmitter may operate with various combinations of the wireless frequency bands, the cordless telephone frequency bands, and/or the short range wireless device frequency bands.

In some embodiments of the invention, the transmitter may suppress RF transmissions to a wireless device located within a volume of influence of the suppressing transmitter. This volume of influence may be based on various factors including a range between the target wireless device and the transmitter, a range between the target wireless device and the target transmitter, a range between the target transmitter and the transmitter, a transmitter power, a target transmitter power, a target receiver sensitivity, a frequency band or bands of the transmitter, propagation effects, topography, structural interferers, characteristics of an antenna at the transmitter including gain, directionality, and type, and other factors.

In some embodiments of the invention, the volume of influence may be selected or predetermined to be larger than a volume impacted by the detonation of the IED (i.e., the detonation volume or "kill zone"). In some embodiments of the invention, the volume of influence may be selected or predetermined based on whether the transmitter is stationary (e.g., at or affixed to a building or other position) or mobile (e.g., in or affixed to a vehicle, person, or other mobile platform). In those embodiments where the transmitter is mobile, the volume of influence may be selected or predetermined based on a speed, either actual or expected, of the mobile platform.

In some embodiments of the invention, the volume of influence may be changed at random or periodic time intervals, or "warble," so that an actual volume of influence may be difficult for combatants to ascertain ahead of time. This may be accomplished by adjusting an output power level of the transmitter. The volume of influence may be also changed by switching between frequency bands at various intervals.

In some embodiments of the invention, multiple transmitters may be used to create an aggregate volume of influence. This aggregate volume of influence may be used to suppress RF transmissions around a stationary position such as, for example, a base, a building, an encampment or other stationary position, or a mobile position such as a convoy of vehicles, a division of troops or other mobile position and thus create an "RF Dead Zone", or area within which certain or all RF transmissions are disrupted, prevented, disabled, jammed or otherwise suppressed. In further embodiments, the multiple transmitters may also transmit at different frequencies to suppress RF transmissions from a wide variety of wireless devices.

In some embodiments, the invention may be sized and/or configured to be mounted in, affixed to, or otherwise carried in a military vehicle or a civilian vehicle (e.g., an armored civilian vehicle) such as HMMWV or other military vehicle, a GMC Tahoe, a Chevrolet Suburban, a Toyota Land Cruiser, or other civilian vehicle. In some embodiments, the invention may be sized and/or configured to be carried by a person in a backpack, case, protective vest, body armor, or other personal equipment or clothing. In some of these embodiments, an antenna operating with the transmitter may be affixed to a head apparatus of the person, such as a hat or helmet, or be hand-held.

In some embodiments, various components of the transmitter may be housed in a ruggedized, sealed, and/or weatherproof container capable of withstanding harsh environments and extreme ambient temperatures. In some embodiments of the invention, this container may include a Pelican case.

In some embodiments of the invention, the transmitter may not suppress or otherwise interfere with RF transmissions of friendly wireless devices. In some of these embodiments, the transmitter may not transmit any significant levels of power in the frequency bands used by these friendly wireless devices.

According to various embodiments of the invention, the transmitter may be deployed with additional technologies. For example, the transmitter may be deployed with technologies designed to assess and screen persons, parties, and/or vehicles approaching a designated location, such as, for instance, checkpoints and/or facilities. The screening technologies may be designed to detect bombs being transported by people, within vehicles, or other (e.g., vehicle borne IEDs used in suicide attacks). The transmitter may be employed to lay down a "blanket" of RF protection over a given area to impede the detonation of any RF triggering device while the screening is taking place, or prior to commencement of the screening. This RF blanket may stop potentially hostile parties from alerting other hostile parties about the checkpoint and its screening techniques while at the checkpoint. In order to ensure proper functionality between the transmitter and the screening technologies, the transmitter may be pre-tested for interoperability, frequency interference, and/or other considerations that may adversely affect the transmitter and/or the screening technologies during the joint deployment.

Various objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 8A illustrates an exemplary embodiment of a transmitting unit encased in an outer case, according to an embodiment of the invention.

FIG. 8B illustrates an exemplary view of the inside of outer case that encases transmitting unit, according to an embodiment of the invention.

FIG. 9C is an exemplary illustration of a cable for connecting the antenna to the transmitting unit, according to an embodiment of the invention.

FIG. 9D is an exemplary illustration of the antenna mounted to a civilian vehicle, according to an embodiment of the invention.

FIG. 10A illustrates an exemplary transmitting unit adapted for transportation on a protective vest, according to an embodiment of the invention.

FIG. 10B illustrates an exemplary transmitting unit adapted for transportation on a protective vest, according to an embodiment of the invention.

DETAILED DESCRIPTION OF PREFERRED EMBODIMENTS

Figure 1A:
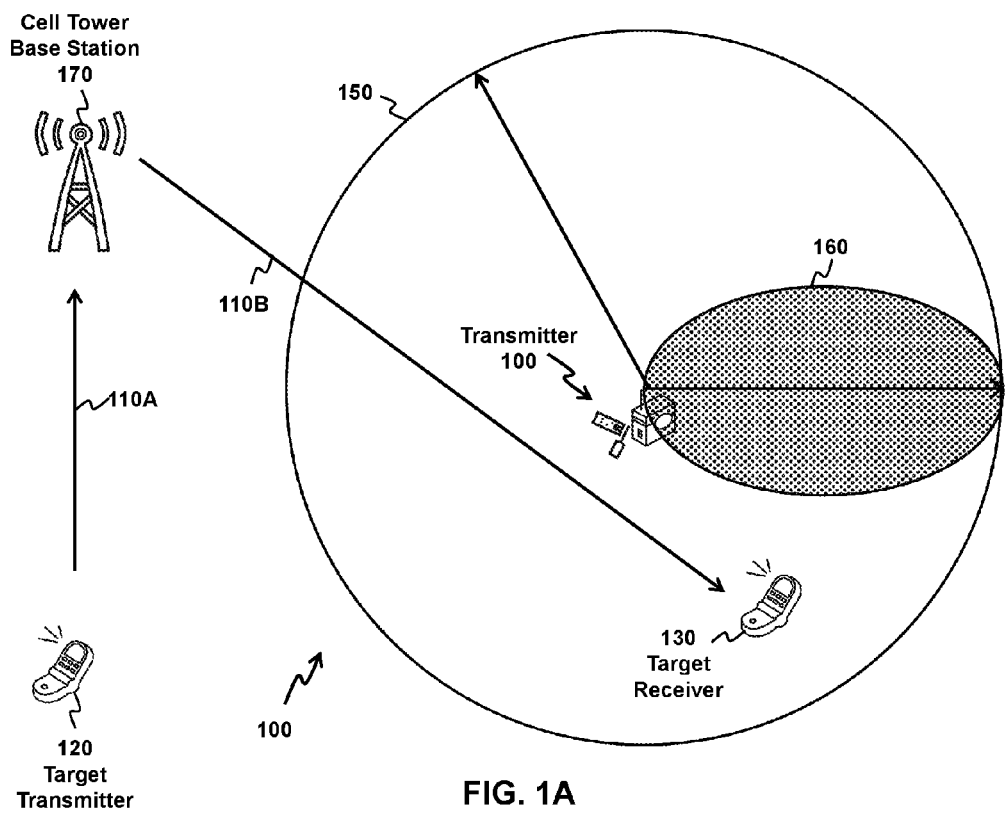
FIG. 1A illustrates an environment in which various embodiments of the invention may operate.

FIG. 1 illustrates an RF transmission system 100 in which a transmitter 100 operates to suppress RF transmissions 110 between a remote target transmitting device 120 and a target wireless receiving device 130 operating in or with an IED (not otherwise illustrated).

As illustrated in FIG. 1A, target transmitting device 120 attempts to initiate or establish RF transmissions 110 (illustrated as an uplink RF transmission portion 110A and a downlink RF transmission portion 110B) with target receiving device 130. While illustrated as a wireless device, target transmitting device 120 may be any fixed, wired, or wireless device capable of establishing RF transmissions 110 with target receiving device 130 via at least one wireless path (such as downlink RF transmission portion 110B) that includes an RF transmitter as would be apparent. As illustrated, RF transmissions 110 may be transmitted from a base station or cell tower 170.

Figure 1B:
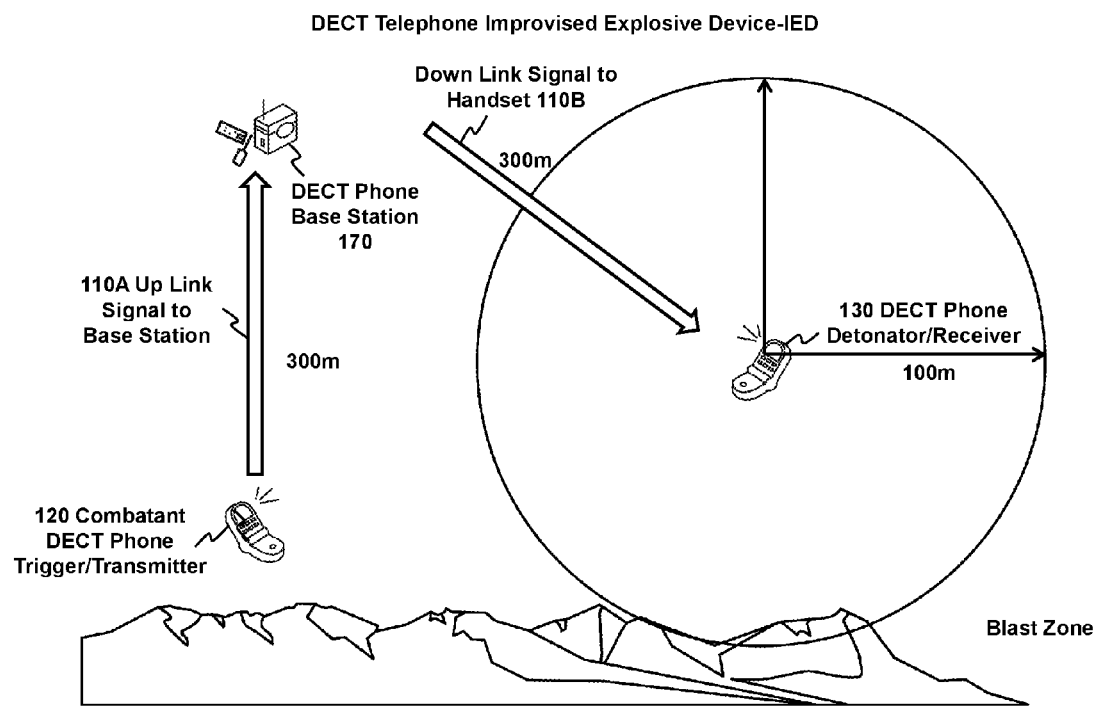
FIG. 1B illustrates wireless paths involved in a DECT telephone connection between target transmitter device and target receiver device by way of a DECT base station.
Figure 1C:
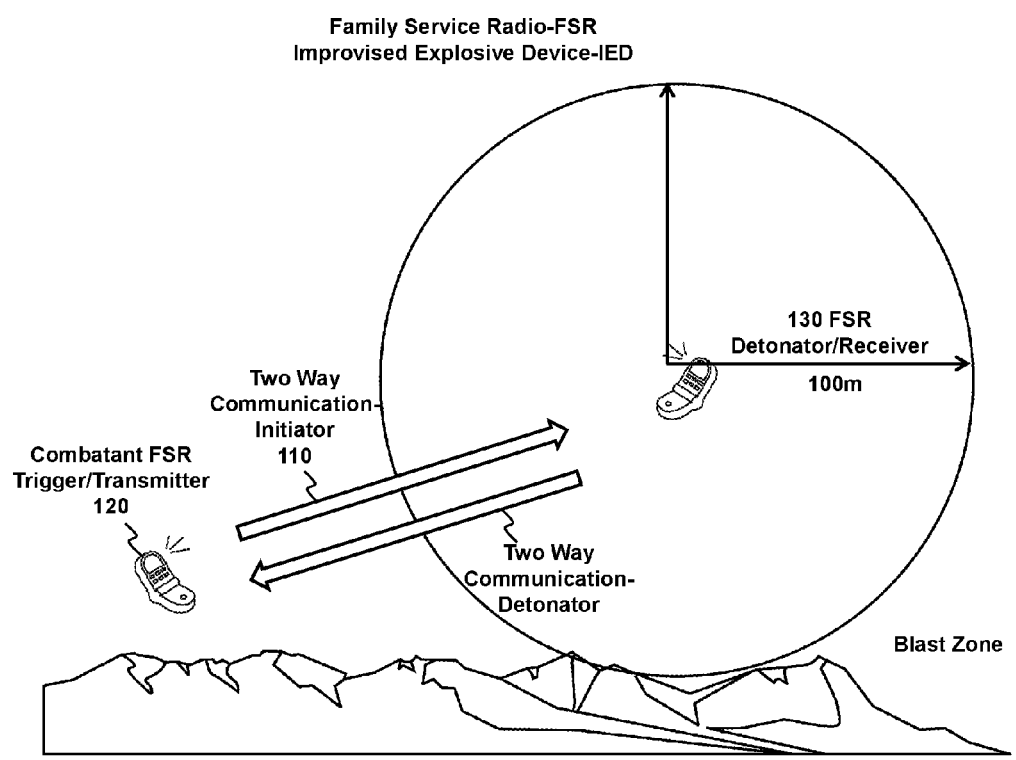
FIG. 1C illustrates a wireless path from target transmitter to target receiver implemented in a Family Service Radio ("FSR") communication of RF transmissions.

However, in some embodiments of the invention, the wireless path may include alternate wireless paths, such as one of the wireless paths illustrated in FIGS. 1B and 1C. More particularly, FIG. 1B illustrates wireless paths involved in a DECT telephone connection between target transmitter device 120 and target receiver device 130 by way of a DECT base station 170. These wireless paths include an uplink portion 110A and a downlink portion 110B of RF transmissions 110. FIG. 1C illustrates a wireless path from target transmitter 120 to target receiver 130 implemented in a Family Service Radio ("FSR") communication of RF transmissions 110. In other wireless communication systems (not shown), RF transmissions 110 may be transmitted from satellite repeaters, directly from target transmitter 120, and other types of RF transmitters as would be apparent. RF transmissions 110 are generally well known and further discussion regarding their operation is not required.

Returning to FIG. 1A, transmitter 100 suppresses RF transmissions 110, by suppressing downlink portion 110B of RF transmissions 110, uplink portion 110A of RF transmissions 110, or in some embodiments, RF transmissions 110 themselves.

Transmitter 100 may transmit a signal including white noise, static or other signals. This signal suppresses (e.g., prevents, disrupts, jams, interferes with or otherwise disables) RF transmissions 110 between target transmitting device 120 and target receiving device 130. According to the invention, the signal from transmitter 100 suppresses RF transmissions 110 within a particular area or region in proximity to transmitter 100 (or more particularly, an antenna associated with transmitter 100) referred to herein as a volume of influence. In some embodiments of the invention, the location of target transmitting device 120 and target receiving device 130 relative to transmitter 100 as illustrated in FIG. 1 may be interchanged.

Two volumes of influence are illustrated in FIG. 1. These volumes of influence are dependant upon a type of antenna employed by transmitter 100. When an omni-directional antenna is used, transmitter 100 may generate a volume of influence 150 depending on the exact nature of the omni-directional antenna among other factors as would be apparent. When a directional antenna is used, transmitter 100 may generate a volume of influence 160, again depending on the nature of the directional antenna among other factors as would also be apparent.

By way of example, an omni-directional antenna may be an antenna that is mounted externally to a housing associated with transmitter 100. This external antenna may be mounted on top of a vehicle or other platform. This type of antenna may be used when the nature of the threat or its approach is unclear or random. On the other hand, the directional antenna may be affixed to or mounted within the housing of transmitter 100. This type of antenna may be used to focus the volume of influence in a particular direction so as to suppress RF transmissions 110 in a particular area.

In addition to antenna configuration, the volume of influence may be affected by other design considerations. These design considerations may include one or more of an amplifier power output, a size of a heat sink for the power amplifiers, heat dissipation, a desired size of the transmitter, a capacity of a battery, an antenna gain, desired frequency bands, a number of frequency bands used, and other design considerations.

Figure 2:
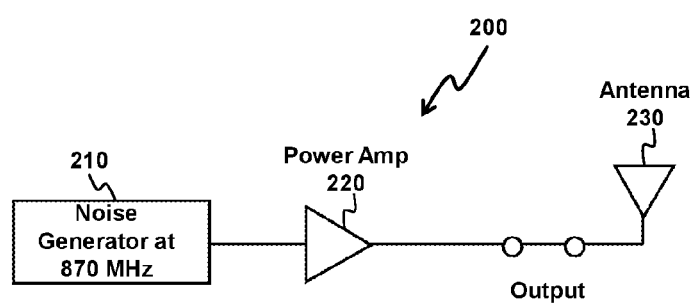
FIG. 2 is a diagram of a system for suppressing RF transmissions in one frequency band according to an embodiment of the invention.

FIG. 2 illustrates a transmitter 200 according to an embodiment of the invention. Transmitter 200 may include at least one noise generator 210. Noise generator 210 may transmit white noise or "static" over a frequency band and centered about a center or carrier frequency associated with a particular RF transmission system. The output of the at least one noise generator 210 may be fed to a wideband power amplifier 220 which generates an amount of power over the frequency band. The output of the power amplifier 220 may be fed to an antenna 230 for transmission.

Figure 3:
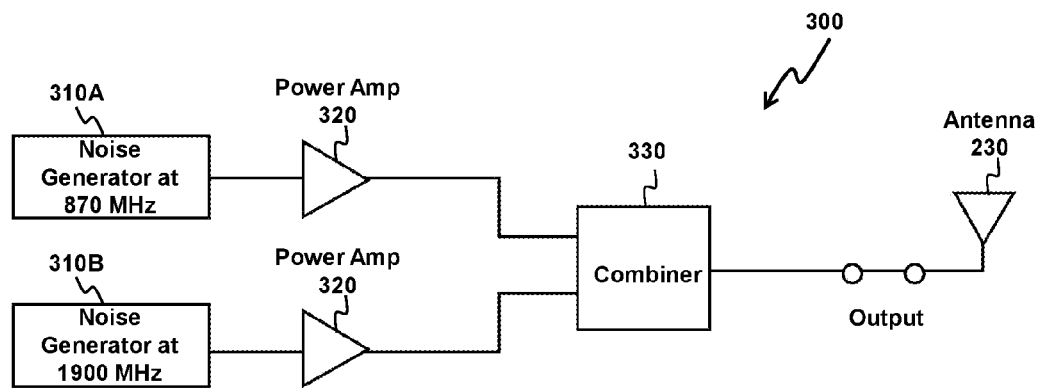
FIG. 3 is a diagram of a system for suppressing RF transmissions in two frequency bands according to an embodiment of the invention.

FIG. 3 illustrates a transmitter 300 according to another embodiment of the invention. Transmitter 300 may include two noise generators 310 (illustrated in FIG. 3 as noise generator 310A and noise generator 310B). Each of the noise generators 310 may have a center frequency associated with the frequency band and a frequency bandwidth. In the embodiment illustrated, noise generator 310A has a nominal center frequency of approximately 870 MHz and operates over a frequency band approximately +/−50 MHz wide, and noise generator 310B has a nominal center frequency at approximately 1900 MHz and operates over a frequency band approximately +/−50 MHz wide. Other center frequencies and frequency bandwidths may be selected for these frequency bands as would be apparent. In addition, other frequency bands, and their corresponding center frequencies and frequency bandwidths, may be selected as would also be apparent.

Transmitter 300 may be configured to operate with other center frequencies and frequency bands which may be used or selected based on the types of devices and standards being utilized in the area where transmitter 300 is deployed. For example, transmitter 300 may be configured to operate with GSM, DCS 1800, DECT, FSR, and other bands.

The output of each of noise generators 310 may be fed to a wideband power amplifier 320. In some embodiments of the invention, each power amplifier 320 may generate approximately 20 watts of power over the frequency band. As would be apparent, in some embodiments of the invention, power amplifiers 320 may generate more or less power depending on various design considerations. As would also be apparent, in some embodiments of the invention, individual power amplifiers 320 may generate more or less power from one another depending on, for example, the types of RF transmissions being suppressed or otherwise prevented.

The output from each wideband power amplifier 320 is combined in a combiner 330. In some embodiments of the invention, combiner 330 may also include signal conditioners, such as filters or other conditioners, to provide various signal characteristics in the output signal as would be apparent. For example, the combined signals may be conditioned to more closely match the frequency bands of interest. The output from duplex filter 330 is fed to the antenna 230 for transmission.

Figure 4:
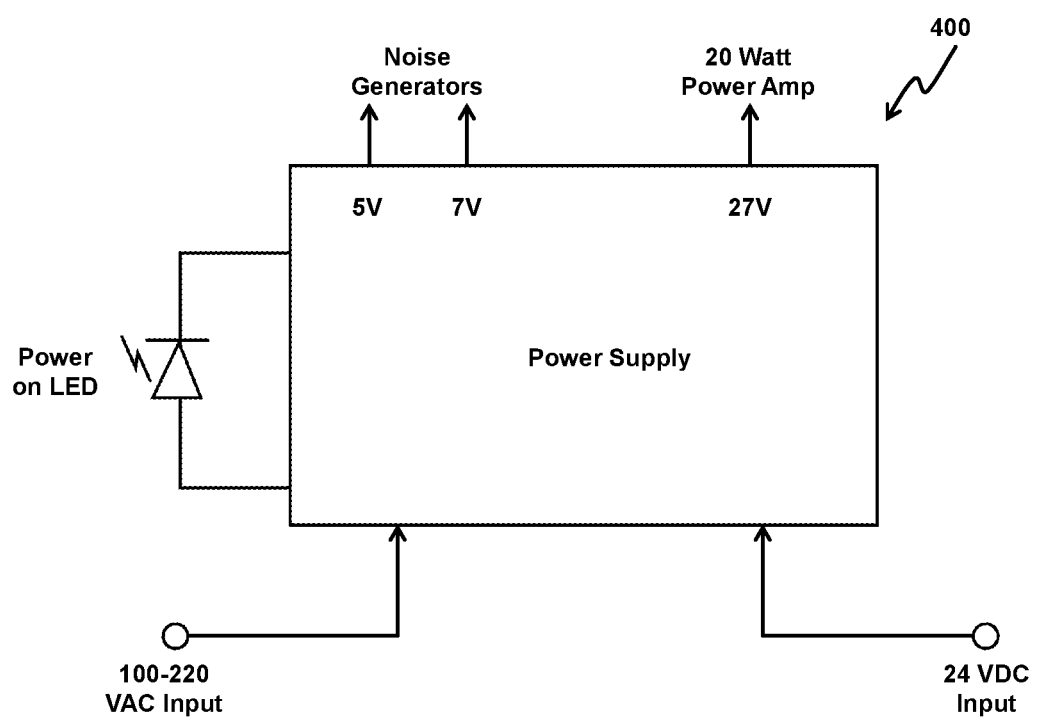
FIG. 4 is a diagram of a transmitter according to an embodiment of the invention.

FIG. 4 illustrates a power supply 400 according to an embodiment of the invention. In some embodiments of the invention, power supply 400 may include inputs for either AC or DC power. For example, the DC input may include a 24 VDC input as may be available in a vehicle. In some embodiments of the invention, the DC input may switchably or otherwise receive 24 VDC or 12 VDC. Other types of DC inputs may be used as would be apparent. The AC inputs may include a 100-220 VAC input as may be available from various electric sources through out the world. Other types of AC inputs may be used as would also be apparent.

Power supply 400 uses various power conversion circuits to generate, for example 5 VDC and 7 VDC for the noise generators and 27 VDC for the power amplifiers. Other voltages may be generated as would be apparent. In some embodiments of the invention, power supply includes an LED circuit to indicate that power is on.

In some embodiments of the invention, transmitter 100, 200, 300, (hereinafter "transmitting unit" unless otherwise specified) is housed in a Pelican case. In some embodiments of the invention, heat sinks may be mounted externally to the Pelican case to remove heat from the power amplifiers. Heat sink may include various passive and active devices design to facilitate or improve heat dissipation including, fins, fans, active cooling plates, ceramic devices, etc., as would be apparent.

Figure 5:
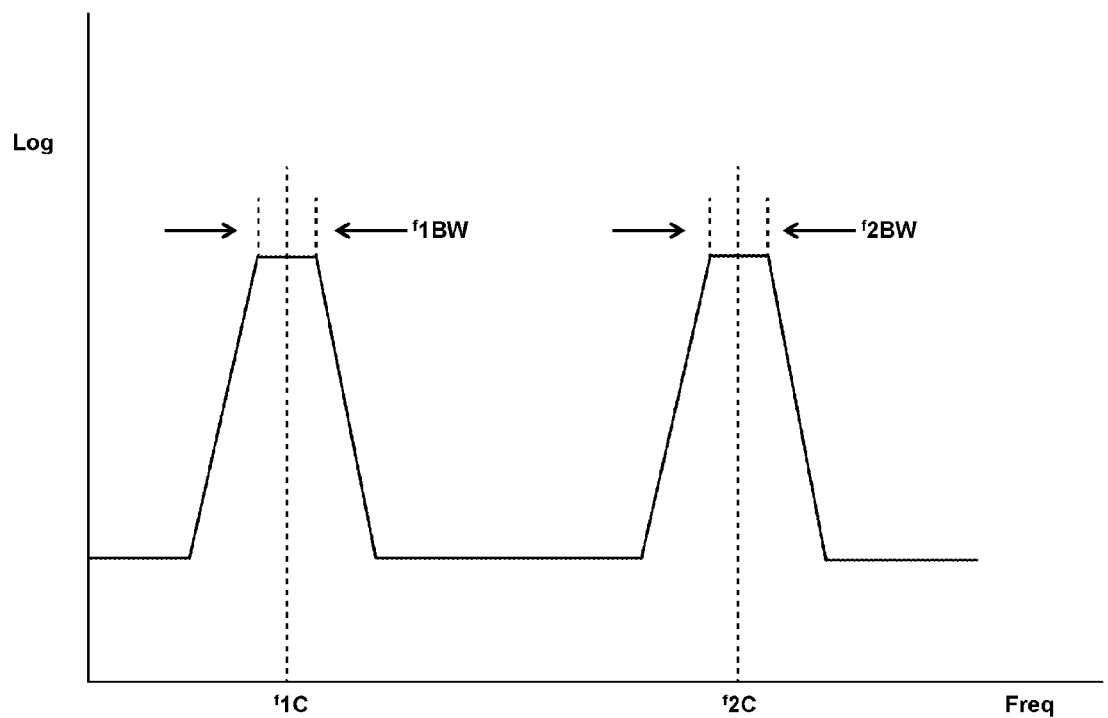
FIG. 5 illustrates an exemplary frequency spectrum of a transmitter that suppresses frequencies in two frequency bands according to an embodiment of the invention.
Figure 6:
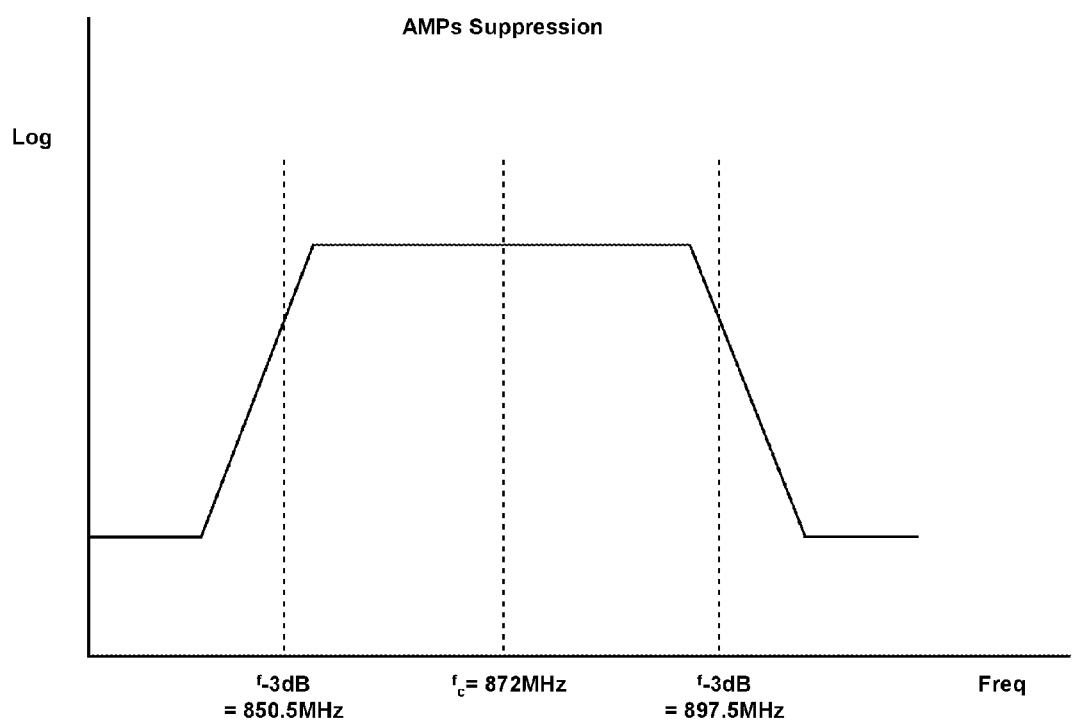
FIG. 6 illustrates an exemplary frequency spectrum for a transmitter that suppresses frequencies in an AMPS RF transmission system according to an embodiment of the invention.
Figure 7:
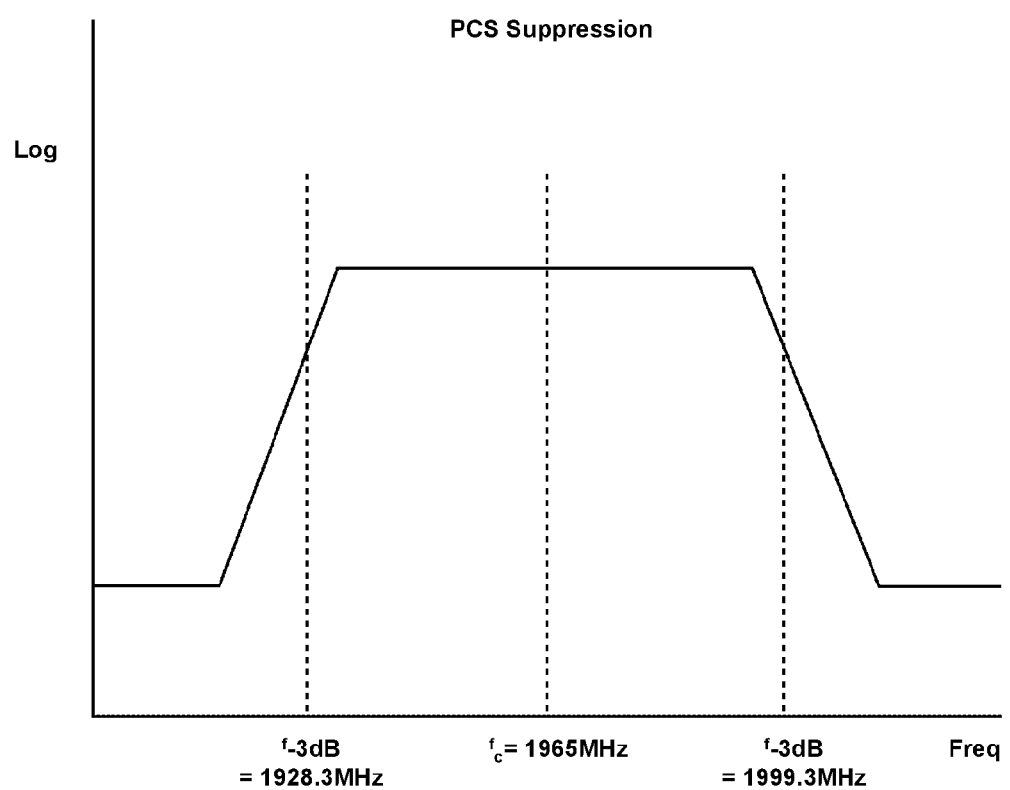
FIG. 7 illustrates an exemplary frequency spectrum for a transmitter that suppresses frequencies in a PCS RF transmission system according to an embodiment of the invention.

FIGS. 5-7 illustrate various exemplary performance characteristics of a transmitting unit operating in accordance with one or more embodiments of the invention. FIG. 5 illustrates an exemplary frequency spectrum of a transmitting unit that suppresses frequencies in two frequency bands according to an embodiment of the invention. In particular, each frequency spectrum includes a nominal center frequency, $f_{1center}$ and $f_{2center}$, respectively, and a nominal frequency bandwidth, $f_{1BW}$ and $f_{2BW}$, respectively. The transmitting unit may be designed so that the frequency spectrum for each of these bands completely overlaps a corresponding frequency band of a particular type of wireless device.

FIG. 6 illustrates an exemplary frequency spectrum for a transmitter that suppresses frequencies in an AMPS RF transmission system according to an embodiment of the invention. As illustrated, this frequency spectrum includes a nominal center frequency of 872 MHz and 3 dB frequencies of 850.5 MHz and 897.5 MHz, which result in a frequency bandwidth of roughly 47 MHz. This bandwidth is wider than that expected for an AMPS RF transmission system, which is nominally 869 to 894 MHz. The transmitting unit may be designed by using 10 dB frequencies to define the frequency bandwidth of the frequency spectrum as would be apparent.

FIG. 7 is an exemplary frequency spectrum for a transmitter that suppresses frequencies in a PCS RF transmission system according to an embodiment of the invention. As illustrated, this frequency spectrum includes a nominal center frequency of 1965 MHz and 3 dB frequencies of 1928.3 MHz and 1999.3 MHz, which result in a frequency bandwidth of roughly 70 MHz. This bandwidth is wider than that expected for an PCS RF transmission system, which is nominally 1930 to 1990 MHz. Again, the transmitting unit may be designed by using 10 dB frequencies to define the frequency bandwidth of the frequency spectrum as would be apparent.

FIG. 8A illustrates an exemplary embodiment of a transmitting unit 800 encased in an outer case 812. Outer case 812 may include a ruggedized, sealed, and/or weatherproof container capable of withstanding harsh environments and extreme ambient temperatures. Outer case 812 may include a locking mechanism 814 (e.g., lock screws) that locks outer case 812. An identification plate 816 that may identify transmitting unit 810. For example, identification plate 816 may include an identification tag, engraved with information identifying transmitting unit 810, and mounted to outer case 812.

FIG. 8B illustrates an exemplary view of the inside of outer case 812 that encases transmitting unit 800, according to various embodiments of the invention. Transmitting unit 800 may include a base unit 818. Base unit 818 may include the electronics that enable transmitting unit 800 to suppress wireless transmissions. Base unit 818 may include a display 820 that may identify a status of transmitting unit 800. This status may indicate one or more of the following conditions of transmitting unit 800 including power on/off, transmitter on/off, transmitter transmitting, power level being transmitted, fault status, temperature status (e.g., high temperature) and other conditions. An input interface 822 may be provided on base unit 818. Input interface 822 may enable a user to control the operation of transmitting unit 800. Controlling the operation of transmitting unit 800 may include controlling a dimension of a volume of influence, a frequency band, a carrier frequency, and/or other functionality of transmitting unit 800.

Figures 8C, 9A, 9B:
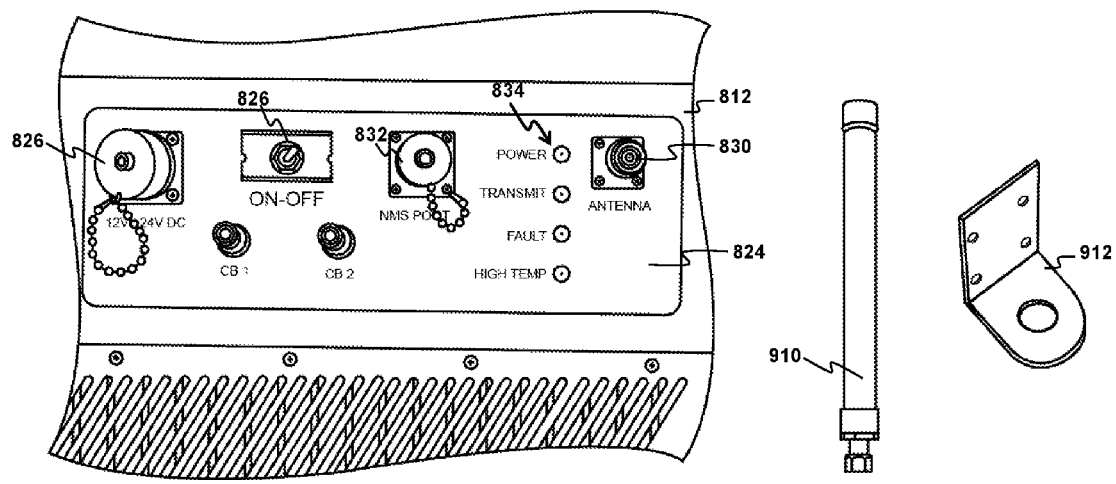
FIG. 8C illustrates an exemplary configuration of an external bus, according to an embodiment of the invention.
FIG. 9A illustrates an exemplary antenna, mounting bracket, and cable for use with a transmitting unit, according to an embodiment of the invention.
FIG. 9B illustrates a mounting bracket 912 that may be used to mount the antenna to a carrier, according to an embodiment of the invention.

In some embodiments, transmitting unit 800 may include an external bus 824 provided in outer case 812. FIG. 8C illustrates an exemplary configuration of external bus 824, according to some embodiments of the invention. External bus 824 may include a power switch 826, a power port 828, an antenna port 830, an external display/control port 832, an outer case display 834, and/or other components. Power switch 826 may enable transmitting unit 800 to be turned off and on by a user. Power port 828 may enable transmitting unit 800 to be connected to an external power supply, as has be discussed above. Antenna port 830 may enable an external antenna to be connected to transmitting unit 800, as was set forth previously. External display/control port 832 may enable an external display/control unit (not shown) to be connected to transmitting unit 800. The external display/control unit may provide some or all of the functionality described above with respect to display 820 and/or input interface 822 externally from outer case 812. For example, the external display/control unit may be hard-mounted or removably mounted to, for example, the dashboard of a vehicle.

Figure 8D:
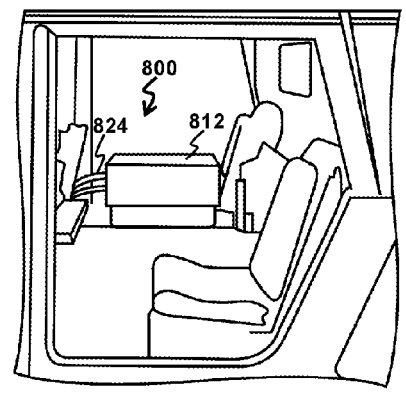
FIG. 8D illustrates an exemplary representation of a transmitting unit deployed within a vehicle, according to an embodiment of the invention.

By providing the various connections available at external bus 824, transmitting unit 800 may be disconnected from external systems at one location, and transported for use at another location without transporting the corresponding external systems (e.g., the antenna, the power source, the display/control unit, etc.). By was of illustration, FIG. 8D is an exemplary representation of transmitting unit 800 deployed at one location, within a vehicle. Via external bus 824, transmitting unit 800 may be connected to one or more external systems, as has been described above. However, removing transmitting unit 800 from the vehicle (e.g., for use elsewhere, to prevent theft, etc.) may be facilitated by simply disconnecting the connections to external bus 824 shown, and taking transmitting unit 800 out of the vehicle.

In some embodiments, the external display control unit may be a handheld unit that can be manipulated by the user without directly accessing outer case 812. Outer case display 834 may display the status of transmitting unit 800 to the user. For instance, outer case display 834 may implement a series of LEDs to convey to the user the status of transmitting unit 800.

FIG. 9A illustrates an antenna 910 for connection to a transmitting unit, in accordance with some embodiments of the invention. In some instances, antenna 910 may include a Kathrein antenna. FIG. 9B illustrates a mounting bracket 912 that may be used to mount antenna 910 to a carrier (e.g., a vehicle, a building, a tower, a fence, etc.). FIG. 9C is an exemplary illustration of a cable 914 for connecting antenna 910 to the transmitting unit.

Figure 9E:
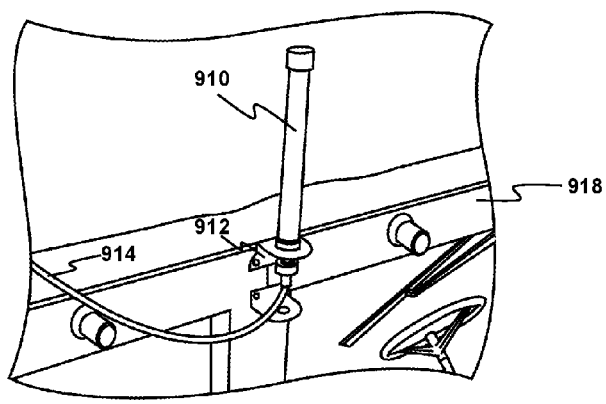
FIG. 9E is an exemplary illustration of the antenna mounted to a military vehicle, according to an embodiment of the invention.
Figure 9F:
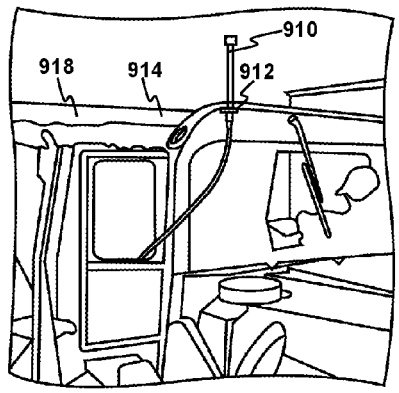
FIG. 9F is an exemplary illustration of the antenna mounted to a military vehicle, according to an embodiment of the invention.

FIG. 9D and FIGS. 9E and 9F are exemplary illustrations of antenna 910 mounted to a civilian vehicle 916 and a military vehicle 918, respectively. In mounting antenna 910 to a vehicle (such as civilian vehicle 916 or military vehicle 918), the roof of the vehicle may be used in conjunction with antenna 910 as a ground plane and signal reflector. In embodiments in which the transmitting unit is to be deployed within civilian vehicle 916, armor plating pre-drilled for antenna 910, mounting bracket 912, and/or cable 914 may be installed on civilian vehicle 916. In some embodiments, armor plating already installed on civilian vehicle 916 may be drilled and/or cut appropriately after installation. In order to ensure proper functionality, the transmitting unit may be tested subsequent to installation within the vehicle. This functionality check after installation may enable confirmation that the transmitting unit has been properly installed and that the various components of the vehicle are not hindering the effectiveness of the transmitting unit.

Figure 10C:
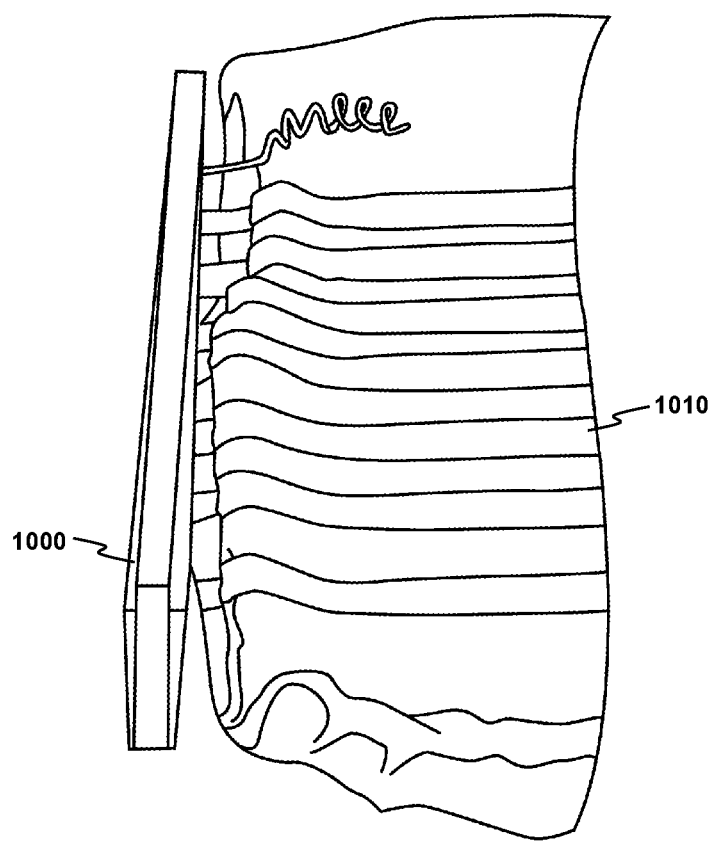
FIG. 10C illustrates an exemplary transmitting unit adapted for transportation on a protective vest, according to an embodiment of the invention.

FIGS. 10A-10C are exemplary illustrations of a transmitting unit 1000 adapted for transportation on a protective vest 1010. Transmitting unit 1000 may include mounting members (not shown), that enable transmitting unit 1000 to be mounted to a standard protective vest 1010. In other embodiments, protective vest 1010 may be adapted specifically for carrying transmitting unit 1000. For example, protective vest 1010 may include a pouch, straps, or other adaptations (not shown) for carrying transmitting unit 1000.

According to various embodiments of the invention, a transmitting unit may be deployed with additional technologies. For example, the transmitting unit may be deployed with technologies designed to assess and screen persons, parties, and/or vehicles approaching a designated location, such as, for instance, checkpoints and/or facilities. The screening technologies may be designed to detect bombs being transported by people, within vehicles, or otherwise being transported by hostile parties (e.g., vehicle borne IEDs used in suicide attacks). The transmitter may be employed to lay down a "blanket" of RF protection over a given area to impede the detonation of any RF triggering device while the screening is taking place, or prior to commencement of the screening. This RF blanket may stop potentially hostile parties from alerting other hostile parties about the checkpoint and its screening techniques while at the checkpoint. In order to ensure proper functionality between the transmitting unit and the screening technologies, the transmitting unit may be pre-tested for interoperability, frequency interference, and/or other considerations that may adversely affect the transmitting unit and/or the screening technologies during the joint deployment.

Other embodiments, uses and advantages of the invention will be apparent to those skilled in the art from consideration of the specification and practice of the invention disclosed herein. Accordingly, the specification should be considered exemplary only.

What is claimed is:

1. A system for variable suppression of radio frequency transmissions, the system comprising:
   a transmitter unit that:
   (i) generates one or more suppressing signals within at least one frequency band, wherein the one or more suppressing signals are output through an antenna to a volume of influence, and
   (ii) changes the volume of influence during operation of the transmitter unit to reduce a possibility of detection of the volume of influence, the transmitter unit comprising:
   a power source port that enables a power source to be operatively coupled to the transmitter unit to provide power to the transmitter unit; and
   an antenna port that enables the antenna to be operatively coupled to the transmitter unit.

2. The system of claim 1, wherein the transmitter unit adjusts a power output level of the transmitter unit to thereby change the volume of influence.

3. The system of claim 2, wherein the transmitter unit adjusts the power output level at periodic time intervals.

4. The system of claim 2, wherein the transmitter unit adjusts the power output level at random time intervals.

5. The system of claim 2, wherein the transmitter unit continuously adjusts the power output level.

6. The system of claim 1, wherein the transmitter unit adjusts the at least one frequency band to thereby change the volume of influence.

7. The system of 6, wherein the transmitter unit adjusts the at least one frequency band at periodic time intervals.

8. The system of claim 6, wherein the transmitter unit adjusts the at least one frequency band at random time intervals.

9. The system of claim 2, wherein the transmitter unit continuously adjusts the at least one frequency band.

10. The system of claim 1, further comprising a mount that mounts the transmitter unit to a vehicle.

11. The system of claim 10, wherein the power source comprises a power system of the vehicle.

12. The system of claim 1, further comprising a mount that mounts the transmitter unit to body armor that is configured to be worn by a user.

13. The system of claim 1, further comprising a mount that mounts the transmitter unit to a stationary structure.

14. The system of claim 13, wherein the power supply comprises an alternating current of the stationary structure.

15. The system of claim 10, wherein the second mounted configuration comprises a mounting of the transmitter unit to a stationary structure.

16. The system of claim 10, wherein the power supply comprises a battery.

17. The system of claim 1, wherein the antenna comprises an omni-directional antenna.

18. The system of claim 1, wherein the first antenna comprises a directional antenna.

19. The system of claim 1, wherein the transmitter unit is controlled to generate the one or more suppressing signals at a signal strength that will provide a volume of influence large enough to inhibit radio frequency transmissions to an explosive device when the antenna is inside of a kill zone of the explosive device.

20. The system of claim 1, wherein the transmitter unit further comprises an outer case, the outer case being ruggedized and sealed.

* * * * *